(12) United States Patent
Chen

(10) Patent No.: US 10,091,488 B2
(45) Date of Patent: Oct. 2, 2018

(54) 3D IMAGE SENSOR AND 3D IMAGE-CAPTURING DEVICE

(71) Applicant: VisEra Technologies Company Limited, Hsin-Chu (TW)

(72) Inventor: Chin-Fu Chen, Hsinchu (TW)

(73) Assignee: VISERA TECHNOLOGIES COMPANY LIMITED, Hsin-Chu (TW)

(*) Notice: Subject to any disclaimer, the term of this patent is extended or adjusted under 35 U.S.C. 154(b) by 134 days.

(21) Appl. No.: 15/204,296

(22) Filed: Jul. 7, 2016

(65) Prior Publication Data
US 2018/0014004 A1    Jan. 11, 2018

(51) Int. Cl.
*G06K 9/00* (2006.01)
*H04N 13/229* (2018.01)
*G02B 27/22* (2018.01)

(52) U.S. Cl.
CPC ....... *H04N 13/229* (2018.05); *G02B 27/2214* (2013.01); *G06K 9/00046* (2013.01); *G06K 9/00201* (2013.01); *G06K 2209/40* (2013.01)

(58) Field of Classification Search
CPC ......... H01L 27/14627; H01L 27/14623; H01L 27/14625; H04N 13/0228; G06K 9/00046
USPC .......................................... 382/115, 124, 154
See application file for complete search history.

(56) References Cited

U.S. PATENT DOCUMENTS

| | | | | |
|---|---|---|---|---|
| 6,031,591 A | * | 2/2000 | Hamanaka | G02B 3/0031 349/122 |
| 7,367,507 B2 | * | 5/2008 | Chen | H04N 1/00989 235/454 |
| 2010/0164881 A1 | * | 7/2010 | Kuo | G02F 1/133512 345/173 |
| 2012/0300989 A1 | * | 11/2012 | Nakashima | G06K 9/00046 382/115 |
| 2013/0026350 A1 | * | 1/2013 | Yao | G01V 8/20 250/221 |
| 2015/0091115 A1 | * | 4/2015 | Lin | H01L 27/1463 257/432 |
| 2015/0092092 A1 | | 4/2015 | Okigawa | |

FOREIGN PATENT DOCUMENTS

| TW | 201224542 A | 6/2012 |
|---|---|---|
| TW | 201515201 A | 4/2015 |

OTHER PUBLICATIONS

The Office Action with the search report of corresponding TW application No. 105126058 dated Mar. 28, 2017 (6 pages).
Taiwanese Office Action with the search report of corresponding TW application No. 105126058 dated Aug. 28, 2017, 4 pages.

* cited by examiner

*Primary Examiner* — Daniel Mariam
(74) *Attorney, Agent, or Firm* — Muncy, Geissler, Olds & Lowe, P.C.

(57) ABSTRACT

A 3D image sensor including a sensing layer, a grid layer, and microlenses. The sensing layer includes sensing units. The grid layer is disposed on the sensing layer, and includes an opacity material and transparent elements penetrating through the opacity material. The microlenses are disposed on the grid layer. Each of the microlenses is located over two adjacent transparent elements.

16 Claims, 5 Drawing Sheets

3D IMAGE SENSOR AND 3D IMAGE-CAPTURING DEVICE

BACKGROUND OF THE INVENTION

Field of the Invention

The present disclosure relates to an image sensor and an image-capturing device, and in particular to a 3D image sensor and a 3D image-capturing device.

Description of the Related Art

In general, personal electronic devices have some secure access modules to prevent others from entering the system of personal electronic devices, such as a mobile phone, a tablet computer, or a laptop computer. Recently, fingerprint-identification devices are mounted on personal electronic devices to provide convenient security implementation.

However, a conventional fingerprint-identification device merely reads the 2D (two-dimensional) image of fingerprint. Therefore, the fingerprint can be faked by a picture of the fingerprint, and the security of the electronic devices is breached.

Although fingerprint-identification devices have generally been adequate for their intended purposes, they have not been entirely satisfactory in security respects. Consequently, it is desirable to provide a solution for the problem of how to improve the security for electronic devices by the fingerprint-identification devices.

BRIEF SUMMARY OF THE INVENTION

The present disclosure provides a 3D image-capturing device and a 3D image sensor for improving the security of the 3D image-capturing device.

The present disclosure provides a 3D image sensor including a sensing layer, a grid layer, and microlenses. The sensing layer includes sensing units. The grid layer is disposed on the sensing layer, comprising an opacity material and transparent elements penetrating through the opacity material. The microlenses are disposed on the grid layer. Each of the microlenses is located over two adjacent transparent elements.

The present disclosure provides a 3D image-capturing device including a a sensing layer, a grid layer, microlenses, and a cover plate. The sensing layer includes sensing units. The grid layer is disposed on the sensing layer, and includes an opacity material and transparent elements penetrating through the opacity material. The microlenses are disposed on the grid layer. Each of the microlenses is located over two adjacent transparent elements. The cover plate is located over the microlenses, and configured for an object touching thereon.

In some embodiments, the opacity material includes opacity portions, and each of the opacity portions is located between two adjacent transparent elements. Each top end of the microlenses is aligned to a center of one of the opacity portions.

In some embodiments, two adjacent transparent elements are symmetric with respect to a center axis of one of the microlenses, and areas of the two adjacent transparent elements are the same.

In some embodiments, areas of the opacity portions are the same. Areas of the opacity portions depends on areas of two adjacent transparent elements. The opacity portions have two or at least two kinds of different areas. Each of the transparent elements is located over one of the sensing units.

In some embodiments, the sensing units under one of the two adjacent transparent elements are configured to generate first image signals, and the sensing units under the other one of the two adjacent transparent elements are configured to generate second image signals, and a depth value is obtained by a processing module according to the first image signals and the second image signals.

In some embodiments, a light source is located at a side of the sensing layer, the grid layer, and the microlenses. The light source is configured to emit a light beam passing through the object, and the light beam emitted from the object passes through the cover plate, the microlenses and the grid layer to the sensing units.

In some embodiments, a shielding element is located between the sensing layer, the grid layer, and the microlenses and the light source. The shielding element is made of heat-resistant materials.

In some embodiments, the sensing layer and the light source are covered by a package material. The light source further includes a heat-dissipating element. A space is located between the cover plate and the microlenses. The space is filled with gas or a transparent material.

In conclusion, the 3D image sensor and the 3D image-capturing device of the present disclosure can detect a depth value of an object, such as a fingerprint of a finger, by the grid layer. Therefore, the security of the 3D image-capturing device is improved.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
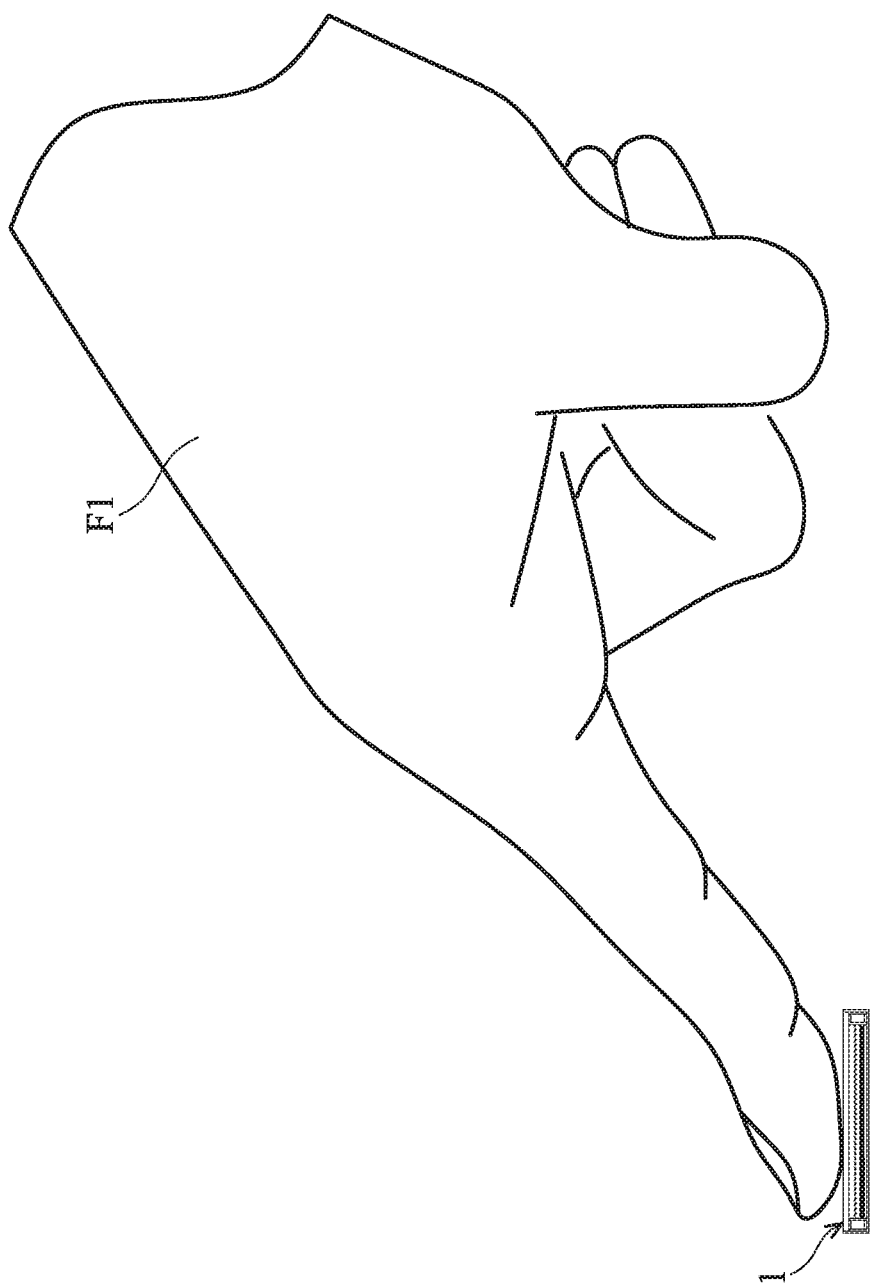
FIG. 1 is a schematic view of a 3D image-capturing device in accordance with some embodiments of the present disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale, or the drawings may be otherwise simplified for clarity of discussion, as they are intended merely for illustration.

Figure 2:
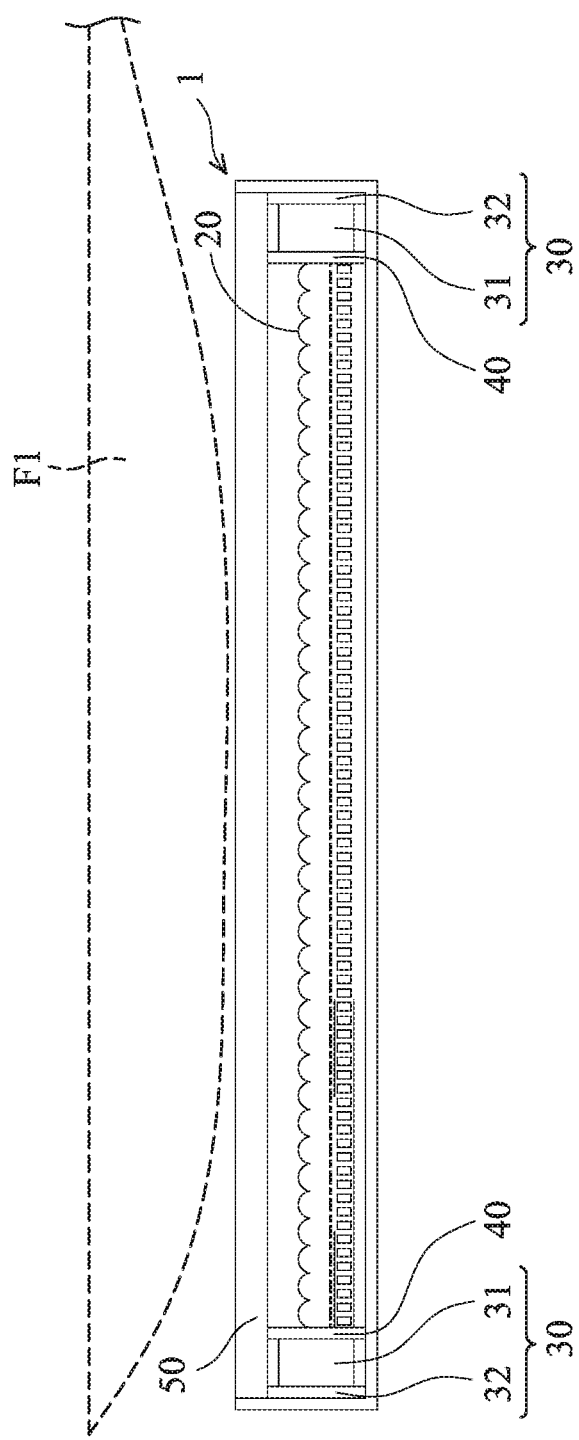
FIG. 2 is a schematic view of the 3D image-capturing device in accordance with some embodiments of the present disclosure.
Figure 3:
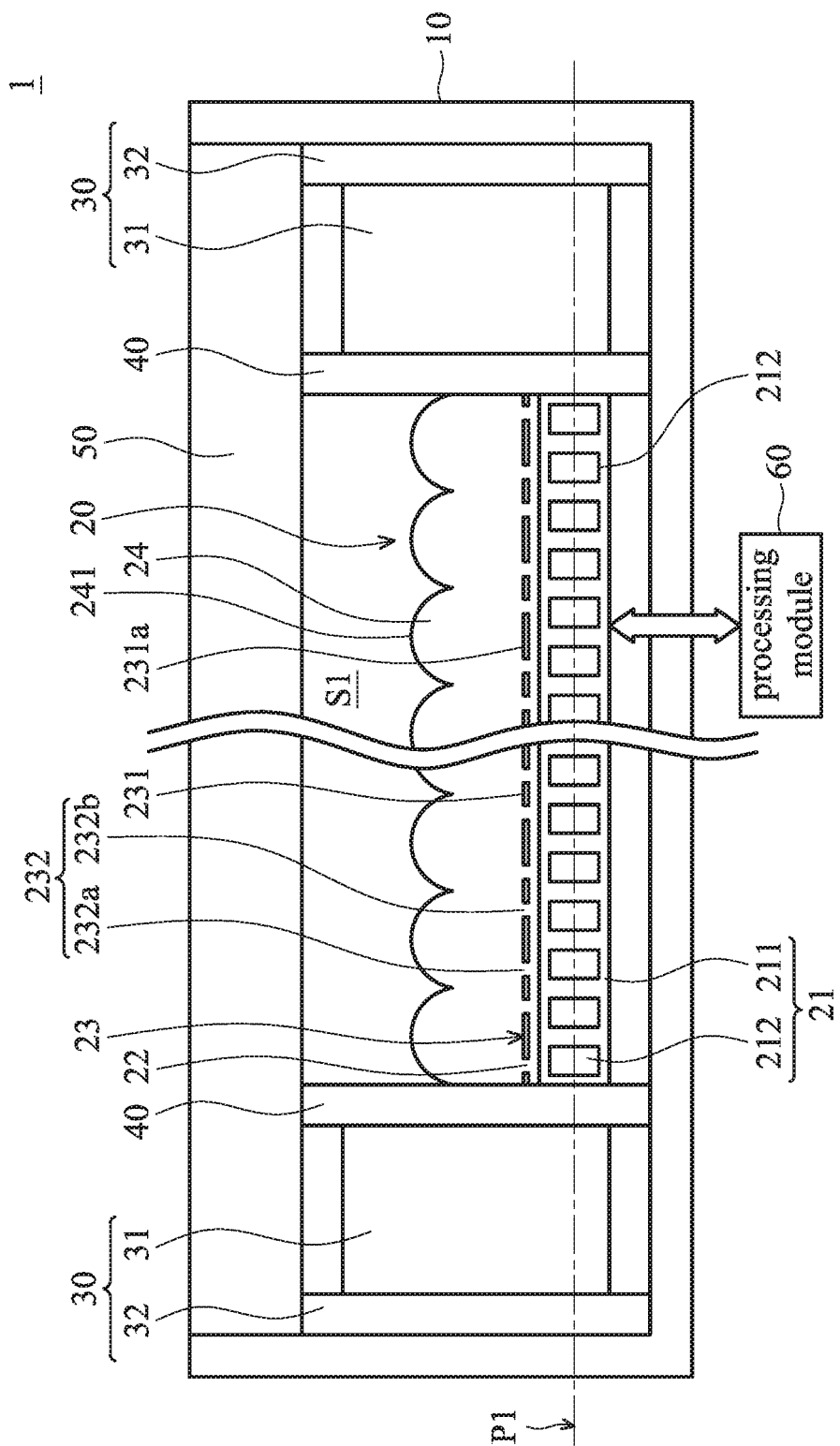
FIG. 3 is a schematic view of the 3D image-capturing device in accordance with some embodiments of the present disclosure.

FIGS. 1 to 3 are schematic views of a 3D (three-dimensional) image-capturing apparatus in accordance with some embodiments of the present disclosure. In some embodiments, the 3D image-capturing device 1 is installed in an electronic device, such as a mobile phone, a tablet computer, or a laptop computer, and provides 3D image-capturing functions and secure authentication functions.

In some embodiments, the 3D image-capturing device 1 can capture a 3D image or a 2D image with depth information of a fingerprint of a finger. The 3D image-capturing device 1 provides fingerprint recording and/or recognition functions.

The 3D image-capturing device 1 includes a package material 10, a 3D image sensor 20, a light source 30, a shielding element 40, and a cover plate 50. The 3D image sensor 20, the light source 30, the shielding element 40, and a cover plate 50 are covered by the package material 10.

The 3D image sensor 20 is configured to capture a 3D image or a 2D image with depth information of an object F1. In some embodiments, the object F1 is a finger. In some embodiments, the 3D image sensor 20 is a CMOS (Complementary Metal-Oxide-Semiconductor) image sensor. In some embodiments, the 3D image sensor 20 is a FSI (Frontside illumination) or BSI (backside illumination) CMOS image sensor, or another suitable sensor.

The 3D image sensor 20 includes a sensing layer 21, a dielectric layer 22, a grid layer 23, and microlenses 24. The sensing layer 21 extends along a reference plane P1. The sensing layer 21 may include all of the following elements, but the sensing layer 21 does not necessarily include all of the following elements, as long as the objective of the sensing layer 21 is achieved.

The sensing layer 21 includes a substrate 211 and sensing units 212. In some embodiments, the sensing layer 21 also includes other optional layers, such as an anti-reflection layer (not shown in figures).

The sensing units 212 are disposed in the substrate 211. The sensing units 212 are arranged in a sensing array along the reference plane P1. In some embodiments, the sensing units 212 are photodiodes. Each of the sensing units 212 is configured to sense an incident light beam and generate an image signal according to the intensity of the light beam falling thereon.

The dielectric layer 22 is disposed on the sensing layer 21. The dielectric layer 22 extends along a plane parallel to the reference plane P1. The dielectric layer 22 is transparent.

Figure 4:
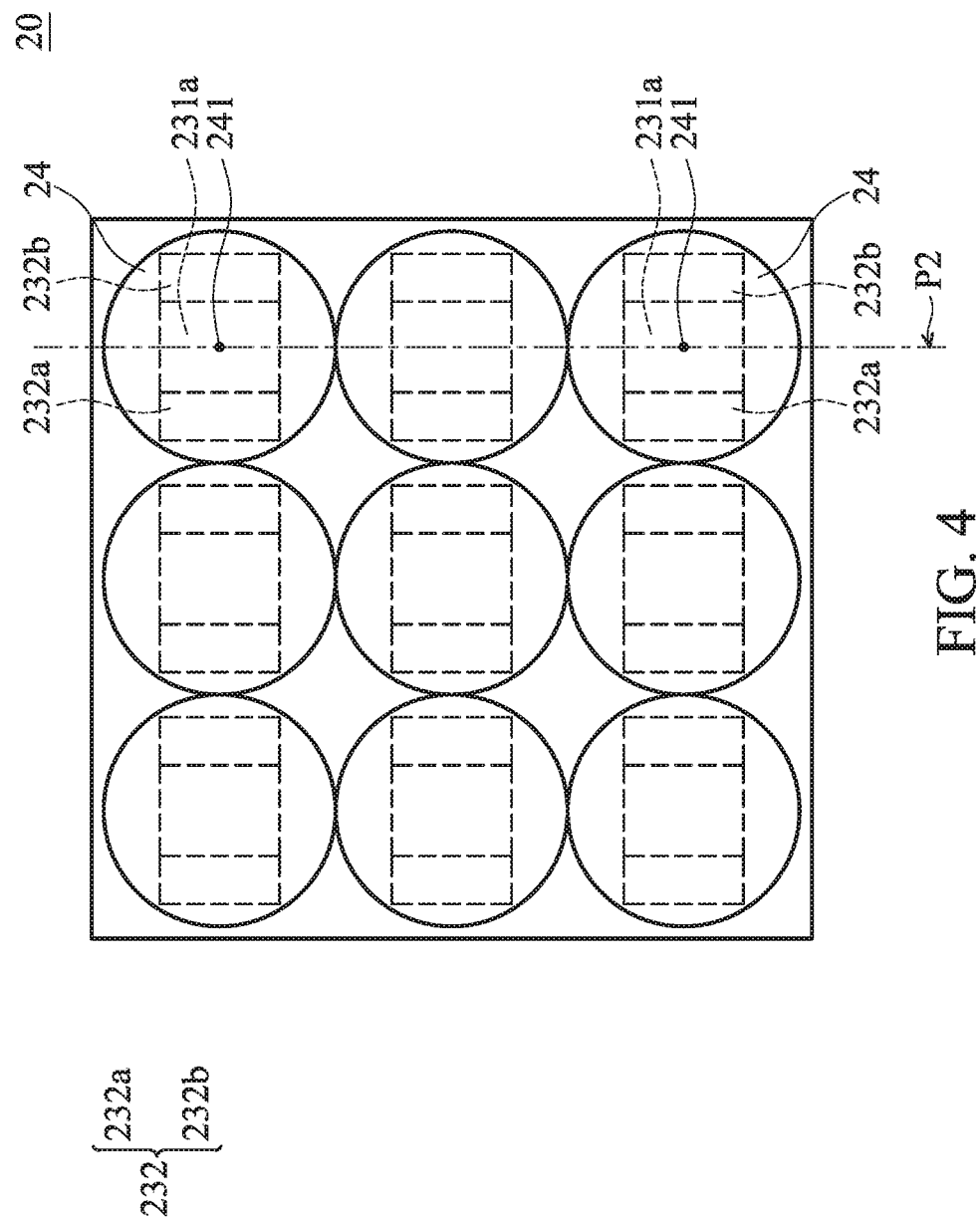
FIG. 4 is a top view of a portion of the 3D image sensor in accordance with some embodiments of the present disclosure.

FIG. 4 is a top view of a portion of the 3D image sensor 20 in accordance with some embodiments of the present disclosure. The grid layer 23 is disposed on the sensing layer 21. The grid layer 23 extends along a plane parallel to the reference plane P1. The grid layer 23 includes an opacity material 231 and transparent elements 232 penetrating through the opacity material 231.

Each of the transparent elements 232 is disposed on one of the sensing units 212. In some embodiments, the opacity material 231 is black. The transparent elements 232 are arranged in a grid array.

The microlenses 24 are disposed on the grid layer 23. The microlenses 24 are arranged in a microlens array. In some embodiments, each of the microlenses 24 is located over two adjacent transparent elements 232 as shown in FIGS. 3 and 4.

In this embodiment, there are no color filters located between the microlenses 24 and the sensing units 212. In some embodiments, the 3D image sensor 20 includes color filters located between the microlenses 24 and the sensing units 212.

As shown in FIGS. 3 and 4, the transparent elements 232 include transparent elements 232a and transparent elements 232b penetrating through the opacity material 231. The transparent elements 232a and the transparent elements 232b are alternately arranged in the grid array. Each of the microlenses 24 is located over one of the transparent elements 232a and one of the transparent elements 232b adjacent to the transparent element 232a.

The opacity material 231 includes opacity portions 231a. Each of the opacity portions 231a is located between two adjacent transparent elements 232 (232a and 232b). Each of the top ends 241 of the microlenses 24 is aligned to the center of one of the opacity portions 231a. Two adjacent transparent elements 232a and 232b are symmetric with respect to a center axis of one of the microlenses 24. The center axis of the microlens 24 passes through the the top end 241 of the microlens 24.

The areas of the transparent elements 232a are equal to the areas of the transparent elements 232b. In some embodiments, the areas of the opacity portions 231a are the same. In some embodiments, the areas of the opacity portions 231a are different. The areas of the opacity portions 231a depend on areas of two adjacent transparent elements 232a and 232b. The opacity portions 231a have two or at least two kinds of different areas.

The light source 30 is located at the sides of the 3D image sensor 20 (the sensing layer 21, the grid layer 23, and the microlenses 24). In some embodiments, the light source 30 is around the 3D image sensor 20. In some embodiments, the light source 30 includes light-emitting units 31 and heat-dissipating elements 32.

The light-emitting units 31 are configured to emit light beams passing through the object F1 in contact with the cover plate 50. In some embodiments, the light-emitting units 31 are light-emitting diodes. The light-emitting units 31 are disposed on the heat-dissipating elements 32, and the heat-dissipating elements 32 are configured to dissipate the heat generated by the light-emitting units 31. The heat-dissipating elements 32 are made of metal, or other materials.

The shielding element 40 is located between the 3D image sensor 20 (the sensing layer 21, the grid layer 23, and the microlenses 24) and the light source 30. In some embodiments, the shielding element 40 is around the 3D image sensor 20. The shielding element 40 is made of heat-resistant materials. The shielding element 40 is configured to block the light beams, which is emitted from the light-emitting units 31, transmitting to the 3D image sensor 20. In some embodiments, the shielding element 40 is configured to block the heat, generated by the light-emitting units 31 transmitting to the 3D image sensor 20.

The cover plate 50 covers the 3D image sensor 20, the light source 30 and the shielding element 40. The cover plate 50 is configured to protect the 3D image sensor 20 in the package material 10. In some embodiments, the cover plate 50 is configured for the object F1 touching thereon. The cover plate 50 is a low reflection over glass. As shown in FIG. 1, the cover plate 50 is located over the microlenses 24. In other words, the cover plate 50 is separated from the microlenses 24, and a space S1 is located between the cover plate 50 and the microlenses 24. In some embodyments, the space S1 is filled with gas or a transparent material.

The 3D image-capturing device 1 further includes a processing module 60 electrically connected to the sensing units 212, and receives the image signals generated from the sensing units 212. In some embodiments, the processing module 60 is electrically connected to the sensing units 212 by wires, and the wires passes through the package material 10. FIG. 3 is a schematic view of the 3D image-capturing device 1, and the wires are not illustrated in figures since the designs of the wires are various.

Figure 5:
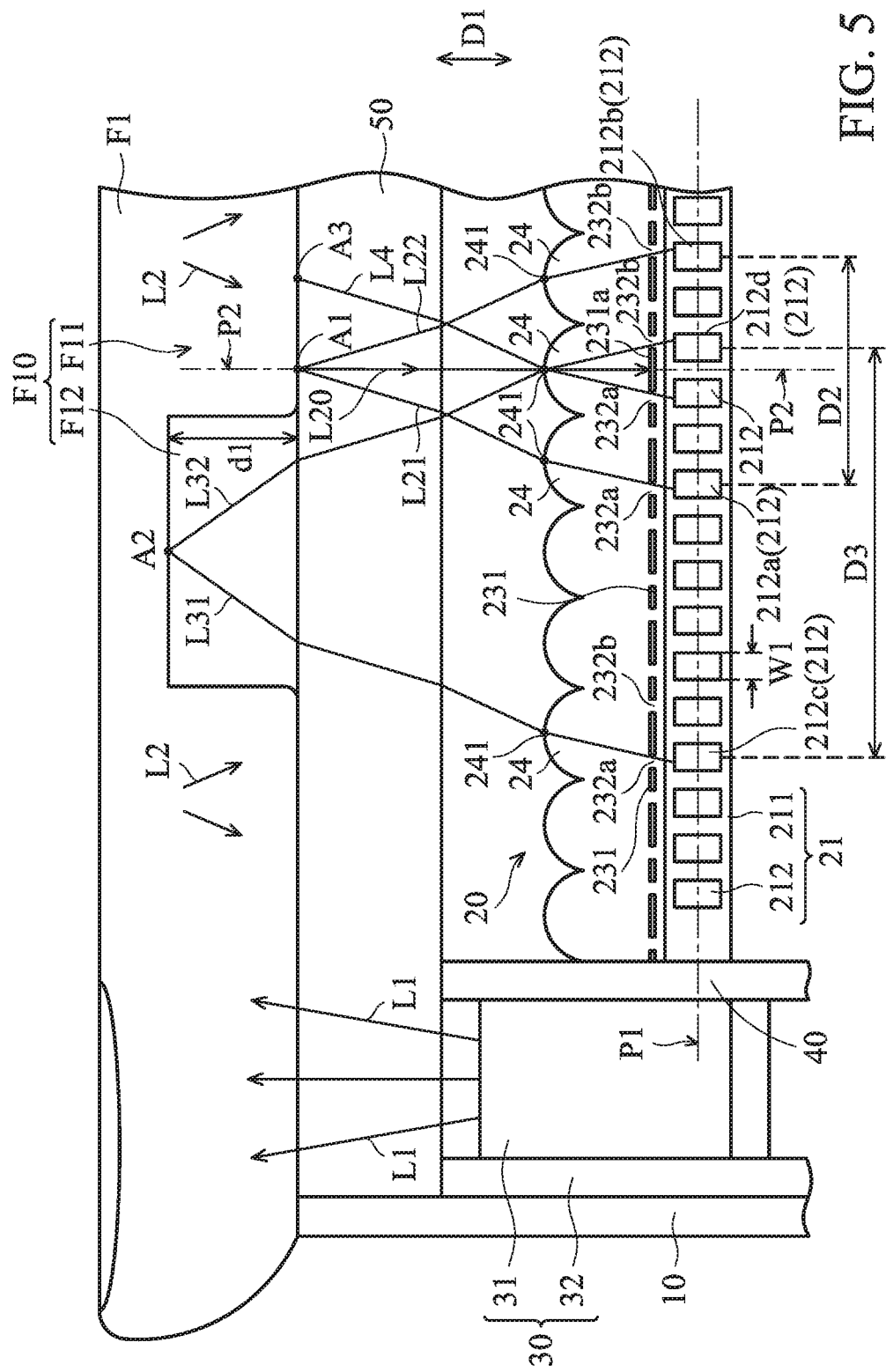
FIG. 5 is a schematic view of the 3D image sensor in accordance with some embodiments of the present disclosure.

FIG. 5 is a schematic view of the 3D image sensor 20 in accordance with some embodiments of the present disclosure. The object F1 is in contact with the cover plate 50. In this embodiment, the object F1 is a finger. The finger F1 has a fingerprint F10, and the fingerprint F10 has protrusions F11 and grooves F12.

As shown in FIGS. 3 to 5, the light beams L1 emitted from the light source 30 are transmitted in the finger F1, and the light beams L1 are scattered in the finger F1 to form light beams L2. A portion of the light beam L2 passes thought the protrusions F11 of the fingerprint F10, and a portion of the light beam L2 passes thought the grooves F12 of the fingerprint F10. The portions of light beams L2 emitted from the protrusions F11 and the grooves F12 of the fingerprint F10 pass through the cover plate 50, the microlenses 24 and the grid layer 23 to the sensing units 212.

For example, a point A1 is located at the surface of the protrusion F11, which is in contact with or adjacent to the cover plate 50, and a light beam L20 is emitted from the point A1. In this case, the point A1, the top end 241 of the microlens 24, and the opacity portion 231a are arranged in a reference plane P2, as shown in FIGS. 4 and 5.

The reference plane P2 is perpendicular to the reference plane P1, and located between the transparent elements 232a and 232b. The transparent elements 232a and 232b are located under the microlens 24.

Moreover, the reference plane P2 is located between two adjacent sensing units 212, which are aligned to the transparent elements 232a and 232b along a vertical direction D1. In this embodiment, the vertical direction D1 is perpendicular to the reference plane P1 or the sensing layer 21.

In other words, the two adjacent sensing units 212 are located at two opposite sides of the reference plane P2. Moreover, the transparent elements 232a and 232b are located at two opposite sides of the reference plane P2. The top end 241 of the microlens 24 is located at the reference plane p2, and the transparent elements 232a and 232b are symmetric with respect to the reference plane P2.

The light beam L20 is emitted toward the sensing layer 21 along the vertical direction D1 (and the reference plane P2) in FIG. 5. The light beam L20 passes through the top end 241 of the microlens 24 and is blocked by the opacity portions 231a. Accordingly, light beams emitted from the portions of the fingerprint F10 over the microlenses 24 (or the opacity portions 231a) in the vertical direction D1 are not detected by the sensing units 212.

However, a light beam L32 emitted by the point A2 (which is at the left side of the reference plane P2 in FIGS. 4 and 5) can be detected by the sensing unit 212 (which is located under the transparent element 232b and at the right side of the reference plane P2 in FIGS. 4 and 5). Moreover, the light beam L32 passes through the top end 241 of the microlens 24 (which is located under the point A1 and at the reference plane P2) and the transparent elements 232b (which is located at the right side of the reference plane P2).

Similarly, a light beam L4 emitted by the point A3 (which is at the right side of the reference plane P2) can be detected by the sensing unit 212 (which is located under the transparent element 232a and at the left side of the reference plane P2). Moreover, the light beam L4 passes through the top end 241 of the microlens 24 (which is located under the point A1 and at the reference plane P2) and the transparent element 232a (which is located at the left side of the reference plane P2).

Accordingly, a 3D image or a 2D image with depth information of the fingerprint F10 can be obtained.

In this embodiment, the sensing units 212 under the transparent elements 232a are configured to generate first image signals, and the sensing units 212 under the transparent elements 232b are configured to generate second image signals.

The processing module 60 receives the first image signals, and generates a first image according to the first image signals. Moreover, the processing module 60 receives the second image signals, and generates a second image according to the second image signals. Therefore, a 2D image of the fingerprint F10 can be obtained according to the first image and/or the second image.

Afterward, the processing module 60 utilizes the technique of phase detection to generate a 3D image according to the first image and the second image. In general, the phase detection (PD) is achieved by dividing the incoming light into pairs of images and comparing them. Through the lens secondary image registration (TTL SIR) passive phase detection is often used in film and digital SLR cameras. The two images are then analysed for similar light intensity patterns (peaks and valleys) and the separation error is calculated.

The processing module 60 obtains depth values of the grooves F12 of the fingerprint F10 according to the separation error of the first image signals and the second image signals.

As shown in FIG. 5, the groove F12 relative to the cover plate 50 has a depth d1, wherein the depth d1 is measured in the vertical direction D1. In some embodiments, the depth d1 is about 50 um. The point A2 is located at the bottom of the groove F12.

The light beam L21 emitted from the point A1 is detected by the sensing unit 212a, which is located under the transparent element 232a. The light beam L22 emitted from the point A1 is detected by the sensing unit 212b, which is located under the transparent element 232b.

In this embodiment, the widths W1 of the sensing units 212 are the same or sustainably the same. The widths W1 are measured parallel to the reference plane P1. In some embodiments, the widths W1 of the sensing units 212 are less than 150 um. Therefore, a distance D2 between the sensing unit 212a and the sensing unit 212b can be calculated by the processing module 60 according to the number of the sensing units 212 between the sensing unit 212a and the sensing unit 212b. In this embodiments, the distance D2 is about 1000 um.

Similarly, the light beam L31 emitted from the point A2 is detected by the sensing unit 212c, which is located under the transparent element 232a. The light beam L32 emitted from the point A2 is detected by the sensing unit 212d, which is located under the transparent element 232b. The distance D3 between the sensing unit 212c and the sensing unit 212d can be calculated by the processing module 60 according to the number of the sensing units 212 between the sensing unit 212c and the sensing unit 212d. In this embodiments, the distance D2 is about 1800 um.

As shown in FIG. 5, the distance D3 is greater than the distance D2 because height of the point A2 relative to the cover plate 50 is higher than the height of the point A1 relative to the cover plate 50. Therefore, the depth d1 of the groove F12 can be obtained by the processing module 60 according to the distance D2 and the distance D3.

In this embodiment, the depth value is obtained by the distance D3 minus distance D2, and then multiplies a parameter, for example 0.0625. The parameter is determined according to the geometry of the 3D image sensor 20 and the cover plate 50. In this case, the value of the distance D3 minus distance D2 is 800 um, and 800 um plus 0.0625 (the parameter) equals 50 um. Therefore, the value of depth d1 of the groove F12 is calculated.

Therefore, a 3D image or a 2D image with depth information of the fingerprint F10 can be obtained. Afterwards, the processing module 60 can recognize or identify the fingerprint F10 of the finger according to the 3D image or the 2D image with depth information.

In conclusion, the 3D image sensor and the 3D image-capturing device of the present disclosure can detect a depth value of an object, such as a fingerprint of a finger, by the grid layer. Therefore, the security of the 3D image-capturing device is improved.

The disclosed features may be combined, modified, or replaced in any suitable manner in one or more disclosed embodiments, but are not limited to any particular embodiments.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D image sensor, comprising:
   a sensing layer comprising a plurality of sensing units;
   a grid layer disposed on the sensing layer, comprising an opacity material and a plurality of transparent elements penetrating through the opacity material; and
   a plurality of microlenses disposed on the grid layer, wherein each of the microlenses is located over two adjacent transparent elements.

2. The 3D image sensor as claimed in claim 1, wherein the opacity material comprises a plurality of opacity portions, and each of the opacity portions is located between two adjacent transparent elements, wherein each top end of the microlenses is aligned to a center of one of the opacity portions.

3. The 3D image sensor as claimed in claim 1, wherein two adjacent transparent elements are symmetric with respect to a center axis of one of the microlenses, and areas of the two adjacent transparent elements are the same.

4. The 3D image sensor as claimed in claim 1, wherein areas of the opacity portions are the same.

5. The 3D image sensor as claimed in claim 1, wherein areas of the opacity portions depends on areas of two adjacent transparent elements.

6. The 3D image sensor as claimed in claim 1, wherein the opacity portions have two or at least two kinds of different areas.

7. The 3D image sensor as claimed in claim 1, wherein each of the transparent elements is located over one of the sensing units.

8. The 3D image sensor as claimed in claim 1, wherein the sensing units under one of the two adjacent transparent elements are configured to generate first image signals, and the sensing units under the other one of the two adjacent transparent elements are configured to generate second image signals, and a depth value is obtained by a processing module according to the first image signals and the second image signals.

9. A 3D image-capturing device, comprising:
   a sensing layer comprising a plurality of sensing units;
   a grid layer disposed on the sensing layer, comprising an opacity material and a plurality of transparent elements penetrating through the opacity material;
   a plurality of microlenses disposed on the grid layer, wherein each of the microlenses is located over two adjacent transparent elements; and
   a cover plate, located over the microlenses, configured for an object touching thereon.

10. The 3D image-capturing device as claimed in claim 9, further comprising a light source located at a side of the sensing layer, the grid layer, and the microlenses,
    wherein the light source is configured to emit a light beam passing through the object, and the light beam emitted from the object passes through the cover plate, the microlenses and the grid layer to the sensing units.

11. The 3D image-capturing device as claimed in claim 9, wherein a shielding element is located between the sensing layer and the light source, between the grid layer and the light source, and between the microlenses and the light source.

12. The 3D image-capturing device as claimed in claim 11, wherein the shielding element is made of heat-resistant materials.

13. The 3D image-capturing device as claimed in claim 9, wherein the sensing layer and the light source are covered by a package material.

14. The 3D image-capturing device as claimed in claim 9, wherein the light source further comprises a heat-dissipating element.

15. The 3D image-capturing device as claimed in claim 9, wherein a space is located between the cover plate and the microlenses.

16. The 3D image-capturing device as claimed in claim 15, wherein the space is filled with gas or a transparent material.

* * * * *